US008502518B2

(12) United States Patent
Piva

(10) Patent No.: US 8,502,518 B2
(45) Date of Patent: Aug. 6, 2013

(54) POWER SUPPLY DEVICE FOR LIGHT SOURCES, SUCH AS HALOGEN LAMPS, AND RELATED METHOD

(75) Inventor: Raffaele Piva, Treviso (IT)

(73) Assignee: Osram Gesellschaft mit beschraenkter Haftung, Munich (DE)

( * ) Notice: Subject to any disclaimer, the term of this patent is extended or adjusted under 35 U.S.C. 154(b) by 255 days.

(21) Appl. No.: 13/079,061

(22) Filed: Apr. 4, 2011

(65) Prior Publication Data

US 2011/0241566 A1 Oct. 6, 2011

(51) Int. Cl.
*G05F 5/00* (2006.01)
*H05B 37/02* (2006.01)

(52) U.S. Cl.
USPC ........... 323/300; 323/320; 323/284; 315/291; 315/294; 315/194

(58) Field of Classification Search
USPC ......... 323/320, 300, 284, 224, 207; 315/307, 315/297, 291, 247, 155, 194
See application file for complete search history.

(56) References Cited

U.S. PATENT DOCUMENTS

| 7,667,408 | B2 * | 2/2010 | Melanson et al. | 315/209 R |
|---|---|---|---|---|
| 7,852,017 | B1 * | 12/2010 | Melanson | 315/291 |
| 8,018,171 | B1 * | 9/2011 | Melanson et al. | 315/194 |
| 8,102,167 | B2 * | 1/2012 | Irissou et al. | 323/300 |
| 8,203,277 | B2 * | 6/2012 | Grotkowski et al. | 315/246 |
| 8,212,491 | B2 * | 7/2012 | Kost et al. | 315/247 |
| 8,339,066 | B2 * | 12/2012 | Thornton et al. | 315/291 |
| 8,344,630 | B2 * | 1/2013 | Grotkowski et al. | 315/155 |
| 2004/0135523 | A1 | 7/2004 | Takahashi et al. | |
| 2007/0040516 | A1 | 2/2007 | Chen | |
| 2009/0243582 | A1 * | 10/2009 | Irissou et al. | 323/320 |

FOREIGN PATENT DOCUMENTS

| JP | 2007267037 A | 10/2007 |
|---|---|---|
| KR | 20060089811 A | 8/2006 |
| WO | 9631097 A1 | 10/1996 |
| WO | 2005115058 A1 | 12/2005 |

OTHER PUBLICATIONS

English abstract of JP 2007267037 A.

* cited by examiner

*Primary Examiner* — Vibol Tan

(57) ABSTRACT

In various embodiments, a power supply device for light sources may include a feed line from mains via a phase-cut dimmer, selectively switchable between a conductive state and a non-conductive state, to permit or interrupt feeding of the device from mains. The device may include a power stage to feed at least one light source from said feed line from mains; a drive stage for said power stage; and a supply stage for said drive stage, said supply stage connected to said feed line from mains. The device may further include a sensor to detect when said dimmer is non-conductive and when said dimmer is conductive. The drive stage may be coupled to the sensor to disable driving of said power stage when the sensor indicates that the dimmer is non-conductive, and enable driving of the power stage when the sensor indicates that the dimmer is conductive.

12 Claims, 4 Drawing Sheets

POWER SUPPLY DEVICE FOR LIGHT SOURCES, SUCH AS HALOGEN LAMPS, AND RELATED METHOD

CROSS-REFERENCE TO RELATED APPLICATION

This application claims priority to Italian Patent Application Serial No. TO2010A000260, which was filed Apr. 6, 2010, and is incorporated herein by reference in its entirety.

TECHNICAL FIELD

This disclosure relates to techniques for supplying light sources such as, for instance, low voltage halogen lamps.

This disclosure was devised with specific attention paid to its possible application to those power supply devices which are adapted to perform an intensity regulating function (so-called "dimming") of the light source.

BACKGROUND

For the power supply of light sources such as halogen lamps, for example halogen lamps with low supply voltage, electronic transformers are used which can perform an intensity regulating function on the light source, i.e. a so-called "dimming" function.

The implementation of this function makes use of the fact that the light intensity of such sources is dependent on the (average) intensity of the current flowing through the light source.

The intensity regulating device—named "dimmer" for brevity—operates so to say by "cutting" the sine wave form, which normally has already undergone a rectification, via an operation of phase cut.

This function can be performed both on the rising edge and on the falling edge of the sine (half) wave. The devices named "phase-cut dimmers" can therefore be classified into two groups:

- devices acting on the rising edge or on the front of the sine (half) wave, i.e. at the beginning of the period at 100 Hz (reference is obviously being made to a sine wave form at 50 Hz, which has already undergone a half-wave rectification),
- devices acting on the falling edge, or on the tail of the sine (half) wave at 100 Hz.

The devices of the first kind, known as "leading edge dimmers" are the more widespread at present, because they are more economical to produce.

The electronic transformers currently employed in the presently considered applications normally include a self-oscillating half-bridge topology, adapted to work suitably with phase-cut dimmers of the previously considered type.

In the case of electronic transformers having a rather high power (for example an input power of 300 W), the use of a self-oscillating topology is more difficult. This is due to the need of a suitable control of input and output currents and of output voltages, particularly during start-up and in protection stages against abnormal operating conditions (overload, over-heating, over-temperature).

In order to properly control the power stage, it is then possible to provide a processor, such as a digital microcontroller, combined with an external driver. Both the processor (microcontroller) and the driver require a constant voltage supply, usually of the order of a few Volts (Vcc). For reasons due to energy saving requirements (specifically in order to reduce consumption in a stand-by mode), this voltage is obtained with a Switch Mode Power Supply stage (SMPS).

FIG. 1 is a block diagram showing a solution corresponding to what has been previously described.

Specifically, in the block diagram of FIG. 1, reference 10 denotes a power stage including, for example, two electronic switches (for example power mosfets) adapted to be alternatively switched on and off, i.e. to be made conductive and non-conductive, associated with respective capacitors 14 in a self-oscillating half-bridge arrangement, adapted to drive the primary winding 16a of a transformer 16. The secondary winding 16b of transformer 16 feeds load L, which is a lamp or lamps (which of course, though shown in the drawing, are not in themselves a part of the supply circuit).

In the example considered in FIG. 1, feeding power stage 10 from mains M is achieved with an input filter 18 and a diode bridge rectifier 20, wherefrom a feed line 21 from mains branches which has a "bus" voltage Vbus, adapted to feed power stage 10.

Reference 22 denotes the drive stage or driver, which turns the switches 12 in power stage 10 on and off alternatively, on the basis of controls received from a processor such as microcontroller 24.

Reference 26 identifies a supply stage (Switch Mode Power Supply stage or SMPS) connected to the feed line 21 from mains. On the output of stage 26 a direct voltage Vcc is present which is adapted to be used as a supply voltage for driver 22 and for the microcontroller processor 24.

Finally, reference 28 denotes a phase-cut dimmer (which is assumed to be interposed between the input of mains voltage M and the input filter 18) which, by operating according to well-known criteria, performs a "cutting" function on the wave form of the mains supply; under the action of an external dimming control (produced according to well-known criteria and means), dimmer 28 is therefore selectively switchable between:

- a conductive state (wherein the mains supply flows to the device) and
- a non-conductive state (wherein the mains supply to the device is interrupted), so as to either permit or interrupt the supply to the device from mains.

The circuit topology shown in FIG. 1 is to be considered as known in itself, which makes it unnecessary to provide for its detailed description herein.

It will be realized, moreover, that in order to solve the technical problem explained in the following, the circuit arrangement of FIG. 1 must be considered exemplary, in general terms, of the topologies of the power supply device for light sources wherein the device includes:

- a feed line from mains (e.g. line 21) through a phase-cut dimmer which performs a "cutting" function on the wave form of the supply from mains, the dimmer being selectively switchable between a conductive state (wherein the supply from mains flows to the device) and a non-conductive state (wherein the supply from mains to the devices is interrupted), so as to either permit or interrupt the supply from mains to the device,
- a power stage to feed at least one light source from said feed line from mains,
- a drive stage for the power stage, and
- a supply stage for the drive stage, said supply stage being connected to said feed line from mains.

SUMMARY

In various embodiments, a power supply device for light sources may include a feed line from mains via a phase-cut dimmer, selectively switchable between a conductive state and a non-conductive state, to permit or interrupt feeding of the device from mains. The device may include a power stage to feed at least one light source from said feed line from mains; a drive stage for said power stage; and a supply stage for said drive stage, said supply stage connected to said feed line from mains. The device may further include a sensor to detect when said dimmer is non-conductive and when said dimmer is conductive. The drive stage may be coupled to the sensor to disable driving of said power stage when the sensor indicates that the dimmer is non-conductive, and enable driving of the power stage when the sensor indicates that the dimmer is conductive.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DETAILED DESCRIPTION

In the following description, numerous specific details are given to provide a thorough understanding of embodiments. The embodiments can be practiced without one or more of the specific details, or with other methods, components, materials, etc. In other instances, well-known structures, materials, or operations are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

The word "exemplary" is used herein to mean "serving as an example, instance, or illustration". Any embodiment or design described herein as "exemplary" is not necessarily to be construed as preferred or advantageous over other embodiments or designs.

Figure 1:
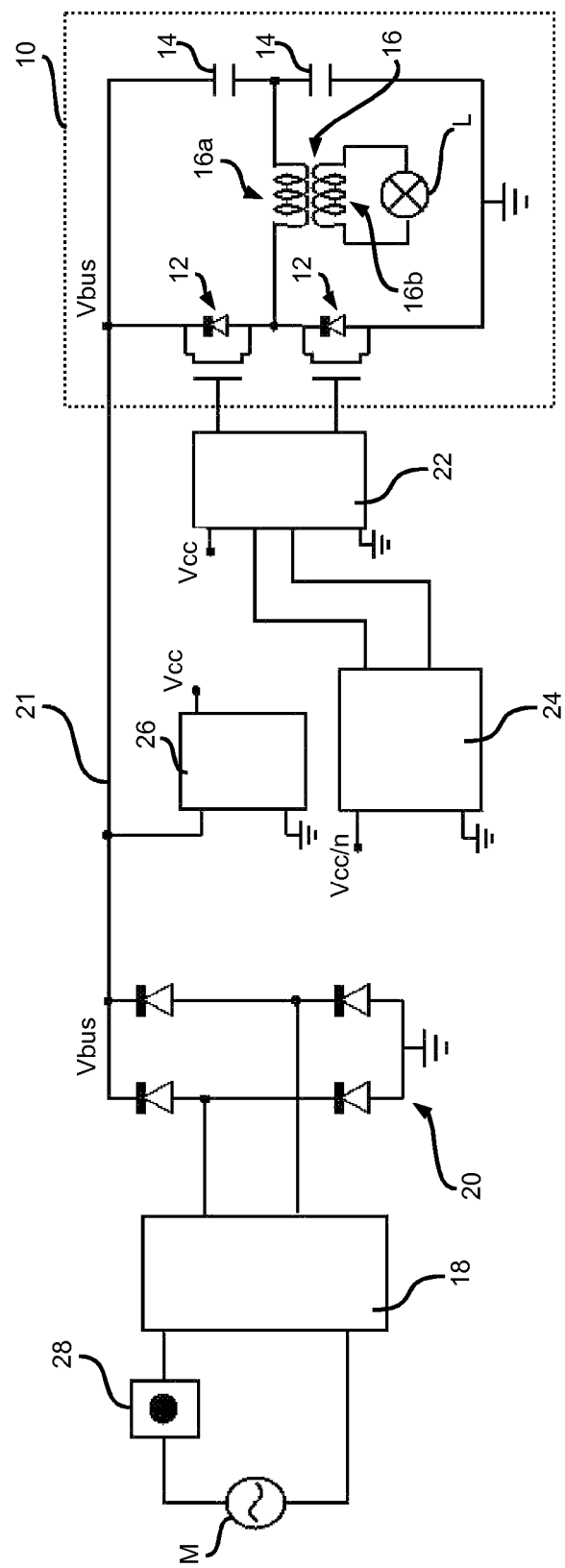
FIG. 1 has already been described in the foregoing.

In various embodiments, the inventor has observed that in arrangements such as the one shown in FIG. 1 (and in similar or equivalent topologies), when during the dimming action the dimmer cuts the input voltage (and as a consequence the supply on line 21) beyond a certain level, the stage which supplies the driver and the processor is fed insufficiently and, in turn, can no longer feed the supply voltage to the driver and to the processor; as a result, in the lamp supply flickering or flashing effects appear which are clearly perceivable.

The most unfavourable conditions occur in the case of "leading edge" dimmers, which perform the cutting function on the rising edge of the supply wave form, so that the supply voltage drop to the driver and to the processing unit takes place at the very moment when the power stage is to be activated.

The inventor has therefore realised that electronic transformers controlled by a commercially available device, such as a microcontroller, cannot operate satisfactorily with "phase-cut" dimmers; when the dimming level increases, i.e. when the lighting intensity is reduced below a certain level, the control processing unit and the power stage driver are supplied insufficiently, and the light source undergoes flickering or flashing effects.

Various embodiments may overcome the previously described drawback.

In various embodiments, this may be achieved through a device having the features specifically set forth in the claims that follow. Various embodiments concern a related method. The claims are an integral part of the technical teaching of the invention provided herein.

Various embodiments base their operation on the principle of reducing the overall energy consumption when the dimmer is "open", i.e. non-conductive. In these conditions, wherein no supply takes place to the power stage of the electronic transformer, various embodiments propose not to supply (particularly not to supply voltage to) the electronic transformer. In this way it is possible to prevent a drop of the output voltage on the stage which generates the supply voltage, preventing therefore a malfunction of the integrated circuits supplied thereby.

Various possible embodiments will be described in the following, reference being made to FIGS. 2 to 4. In these two Figures, parts, elements or components identical or equivalent to parts, elements or components already described with reference to FIG. 1 are denoted by the same reference numbers; for the sake of brevity, therefore, the description thereof will not be repeated in the following.

Figure 2:
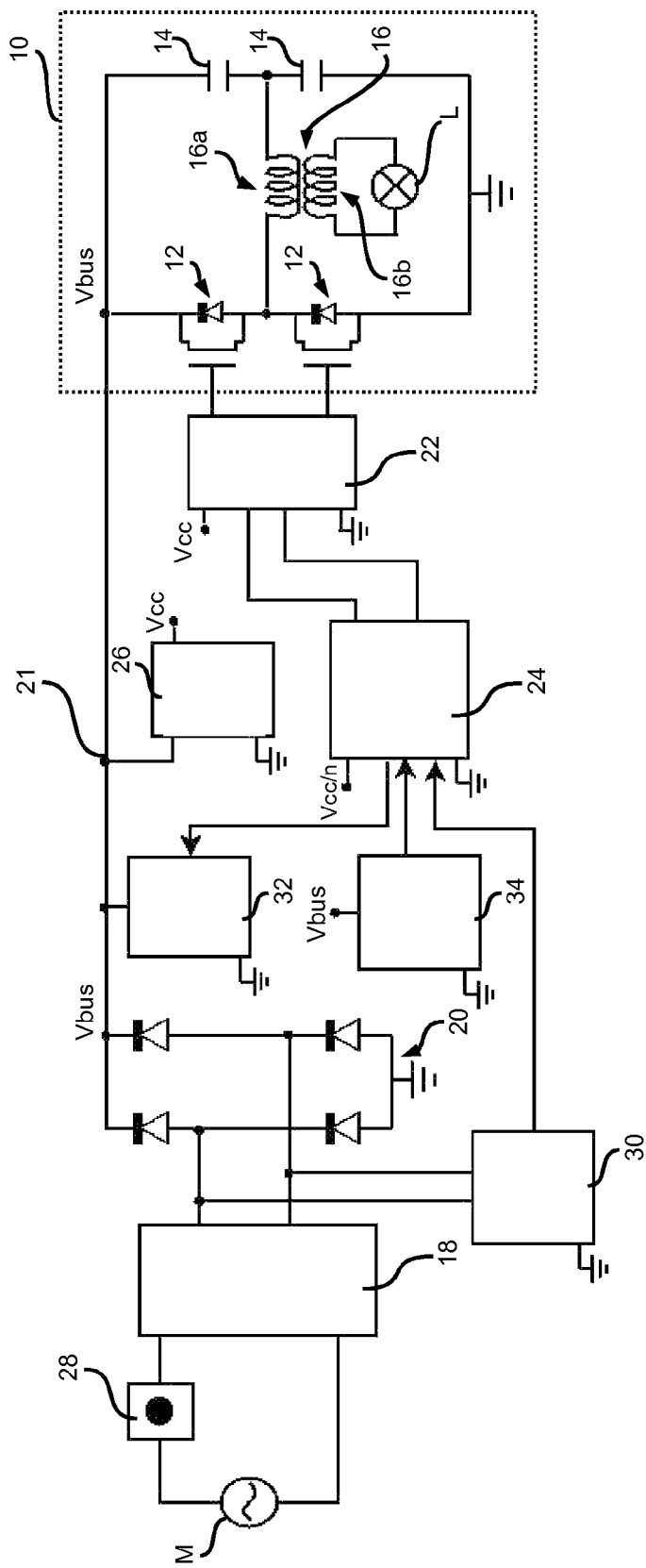
FIG. 2 shows a block diagram representative of various embodiments.

In the general diagram of FIG. 2, the circuit topology which has previously been described referring to FIG. 1 is complemented by the provision of a sensing element or detector 30, adapted to detect when dimmer 28 is non-conductive, i.e. when it is cutting the supply wave form.

In this connection, it will be appreciated that dimmer 28 is not necessarily a part of the supply device according to the disclosure.

In various embodiments, element 30 may include any device which senses the wave form from dimmer 28, and which is adapted to detect when this wave form crosses zero because the dimmer is "cutting" the sine wave form from mains M.

In various embodiments, such a device may essentially comprise a so called Zero Crossing Detector (ZCD).

In various embodiments, detector 30 is arranged at the output of input filter 18. Such an arrangement is however not mandatory, as the ZCD might be arranged in another position as well, for example directly at the output of dimmer 28.

When detector 30 detects the zero level of the supply towards the device, it outputs a signal to processor 24 (in the following simply named "microcontroller" 24 for brevity).

When the signal from detector 30 indicates a zero level, which corresponds to dimmer 28 interrupting the supply to the device, microcontroller 24 operates:

by disabling the outputs to power stage 10, interrupting the supply to the stage from the feed line 21 form mains (i.e. by "switching off" the related half-bridge circuit), by activating a dummy load 32 to voltage Vbus from rectifier 20, and by automatically setting to a low-consumption stand-by mode.

The first and the third command/operation are aimed at minimizing the energy consumption of the circuit, in a state wherein the circuit itself does not receive supply power from mains, because dimmer 28 is "cutting" the wave form from mains M and at the moment is an open circuit.

The second command/operation is aimed at making dimmer 28 operate correctly when it closes, i.e. when dimmer 28 becomes conductive again, by restoring the voltage supply from mains M to the electronic transformer. A detector stage 34 senses the level of voltage Vbus on feed line 21 from mains M, and is therefore able to send to microcontroller 24 a signal indicating that such voltage has exceeded a predetermined threshold level, which reveals that dimmer 28 has so to say "switched on" the converter again.

The dummy load 32 is designed so as to take into account the needs of a minimum absorption of the power induced by dimmer 28, in order to avoid flickering and flashing. As a matter of fact, when dimmer 28 closes, i.e. becomes conductive and therefore applies again the voltage from mains to the circuit, the current flows through load 32, therefore allowing dimmer 28 to operate properly. At the same time, the detector stage 34 sends a corresponding signal to microcontroller 24, indicating that dimmer 28 has restored the supply to the device.

Microcontroller 24, as a consequence, operates:
by restoring the normal operating conditions, from the low absorption stand-by mode;
by enabling again the outputs to driver 22, i.e. enabling again the supply to power stage 10 from feed line 21 from mains, and
by deactivating dummy load 32, so as to maximize the efficiency of the electronic transformer, while preventing the load 32 to stay activated in states wherein its presence is no longer needed to ensure the operation of dimmer 28.

In various embodiments, the output voltage Vcc of stage 26 (although the latter stage is connected to the feed line 21 from mains) is not subjected to a drop even in the case wherein the dimming level is high, i.e. when the lamp is brought to a low brightness state, as low as an almost total switch-off, allowing therefore to use dimmers particularly of the phase-cut type, even for electronic transformers provided with a processor such as microcontroller 24.

In various embodiments, for example in the case of high power transformers, it is possible to use an electronic transformer in place of standard electromagnetic transformers operating at 50 Hz.

Figure 3:
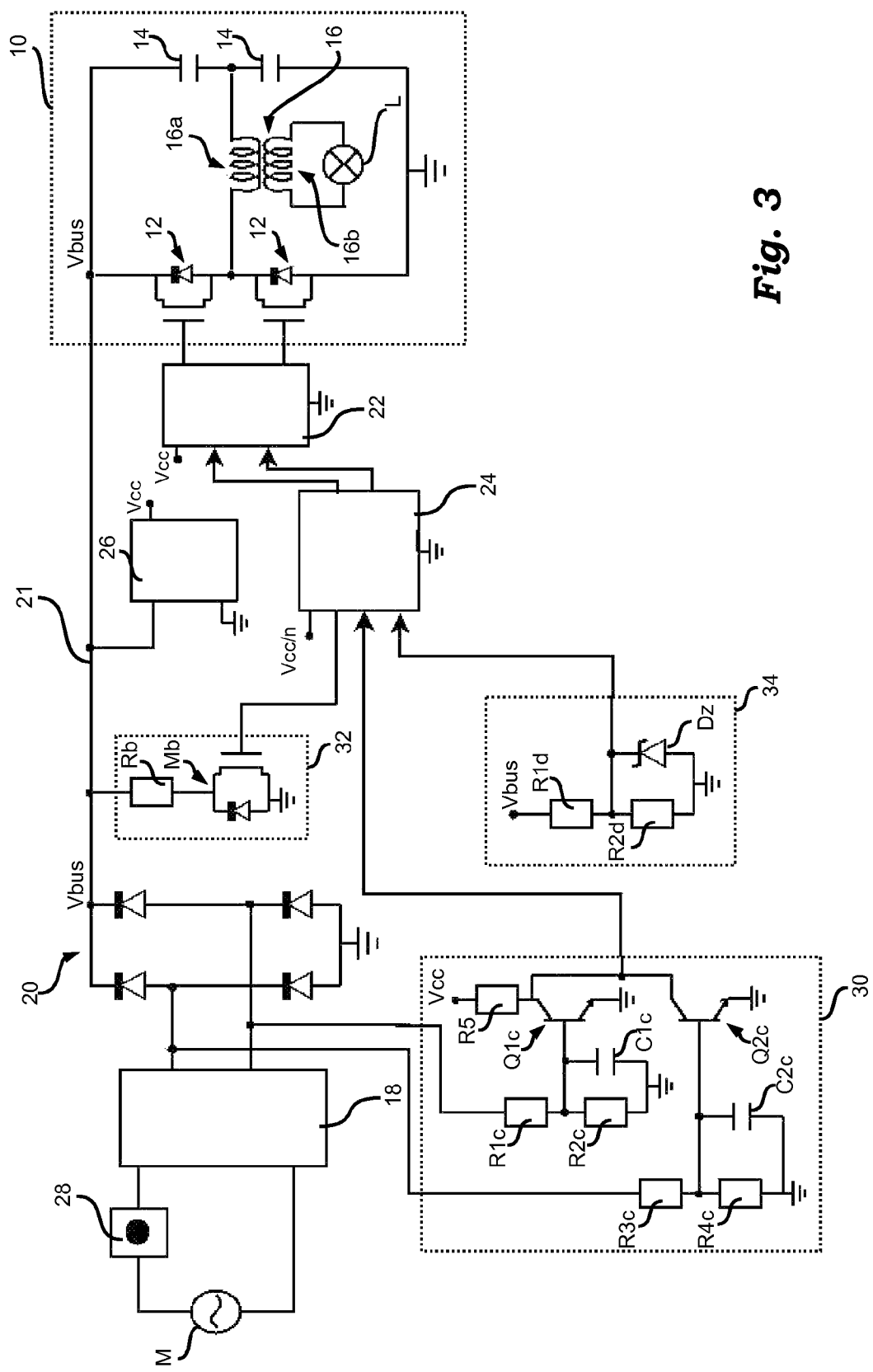
FIGS. 3 and 4 show further details of various embodiments.
Figure 4:
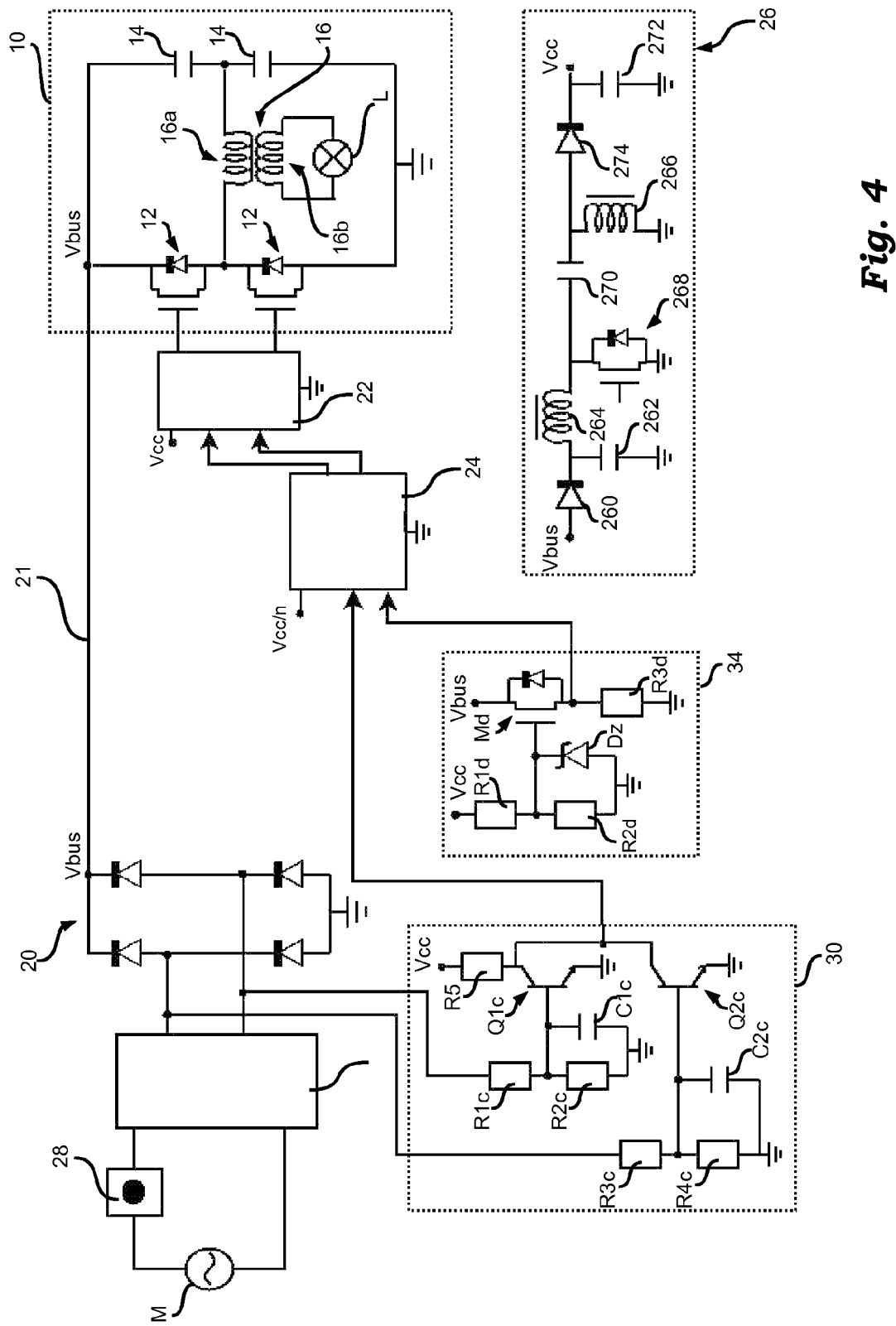

In the embodiments depicted in FIGS. 3 and 4, the zero level detector 30 may include two RC networks which operate as two voltage dividers, the higher branches whereof (resistors R1c and R3c) are connected to both output lines of filter 18, and the lower branches whereof (respectively parallel to resistor R2c and capacitor C1c and parallel to resistor R4c and capacitor C2c) operate between the centre point of divider/filter rc and ground, transferring the charge voltages of capacitors C1c and C2c to the base terminals of two bipolar transistors Q1c and Q2c, e.g. npn transistors. The emitters of both transistors Q1c and Q2c are grounded, and the related collectors, mutually connected, give microcontroller 24 a "zero crossing" signal. Both bipolar transistors Q1C, Q2C are driven by the line and the neutral phase of the supply voltage.

In practice, for example thanks to the presence of capacitors C1c and C2c), said signal not only indicates an instantaneous zero crossing, but also reveals that the output of dimmer 28 stays at zero for a certain period of time (longer or shorter as a function of the dimming level), because dimmer 28 is "cutting" the wave form from mains therefore interrupting the supply to the device.

Reference R5 denotes a biasing resistor, interposed between voltage Vcc and the collector of transistor Q1c.

In the embodiment of FIG. 3, dummy load 32 may include simply a resistor Rb connected between line Vbus and an electronic switch including, for example, a mosfet Mb, the gate of which is driven by microcontroller 24. When switch Mb is closed, resistor Rb is interposed between voltage Vbus and ground, and represents therefore a load for the related voltage. When switch Mb is open, resistor Rb is disconnected from ground and is floating, therefore not representing a load.

In the shown embodiment, load 32 is designed in such a way that microcontroller 24 drives switch Mb, e.g. a mosfet N, so that the switch is energized at every zero crossing, and is de-energized as soon as dimmer 28 is conductive and enables the power stage.

The converting stage 26 can therefore be designed with a "buck" topology, by using voltage Vbus as an input voltage to the buck converter.

In the embodiment of FIG. 3, the detector stage 34 is designed with a structure which substantially resembles a voltage divider, interposed between line 21 (voltage Vbus) and ground, the divider including a first resistor R1d and a second resistor R2d, the lower branch of the divider including moreover a zener diode Dz connected in parallel to resistor R2d, the cathode being coupled to the centre point of the divider and to a corresponding input of the microcontroller.

The zener diode Dz in stage 34 performs a "clamping" function on high voltage values.

The output of the corresponding voltage divider follows the state of line 21 (voltage Vbus) so that, when voltage Vbus on line 21 reaches a "high" level, higher than an enable threshold, microcontroller 24 leaves the stand-by mode, activating the power stage and disabling load 32.

In the embodiment of FIG. 4, detector 30 is designed according to the criteria which have already been described referring to FIG. 3.

For stage 34, the embodiment of FIG. 4 has the voltage divider arrangement, with the zener diode Dz previously described with reference to FIG. 3, complemented by the presence of an electronic switch Md (once again comprising for example a mosfet), which selectively connects the output of the voltage divider, provided with zener diode Dz, to a grounded resistor R3d, which is serially connected with the switch of interest, the connection line to microcontroller 24 being linked to the centre point between electronic switch Md and resistor R3d.

In this embodiment, the gate of switch Md is connected to voltage Vcc through the voltage divider, with the possibility of having the said gate voltage "clamped" by the zener diode. The source voltage of switch Md is connected to microcontroller 24, so as to supply the signal for activation.

The said source voltage, denoted by Vs, equals Vbus until the value of resistor R3d is much higher than resistance Rds_on (i.e. the on-state resistance) of mosfet Md, so that the following relation is fulfilled:

$$V_G - V_{BUS} \geq V_{TH} \rightarrow V_{BUS} \geq V_G - V_{TH}$$

where $V_G$ is the gate voltage e $V_{TH}$ is the threshold voltage of mosfet Md. Once the condition is no longer fulfilled, Vs, i.e. the source voltage of the mosfet, equals $V_G - V_{TH}$. In this way, in comparison with the embodiment of FIG. 3, the signal supplied to microcontroller 24 has sharper and more precise edges.

In the embodiment of FIG. 4, dummy load 32 is practically embedded within stage 26, which in this example is realised as a converter, having a topology currently known as SEPIC (Single-Ended Primary Inductance Converter).

The SEPIC converter therefore includes a diode 260, the anode of which is coupled to voltage Vbus and the cathode of which is connected to a grounded capacitor 262. References 264 and 266 denote two (mutual) inductors which are typical in SEPIC topology.

Specifically, the first inductor 264 can be considered as included in a first Π-shaped structure, the side branches of which, connected to ground, are respectively made up by previously described capacitor 262 and by an electronic switch such as a mosfet 268, while inductor 264 is the horizontal branch of the letter Π.

The second inductor 266 can on the contrary be considered as a part of a further Π-shaped structure, cascaded with the previous Π-shaped structure, with the interposition of a capacitor 270. The second Π-shaped structure includes, as side or vertical branches connected to ground, the second inductor 266 and a further capacitor 272, at the ends whereof the output voltage Vcc is applied, and the horizontal branch whereof is comprised of a diode 274, the anode of which is connected to inductor 266 and the cathode of which is connected to capacitor 272, and therefore to voltage Vcc.

A SEPIC converter allows moreover the output voltage to be higher than, lower than or equal to the input voltage; as a matter of fact, the output of the SEPIC converter is controlled by the duty cycle of the control switch (mosfet 268 in the illustrated embodiment). The SEPIC converter resembles therefore a traditional buck-boost converter, with added advantages due to having a non-inverted output (the output voltage has the same sign as the input voltage), to the isolation between input and output (provided by capacitor 270 in series) and to the possibility of a complete shutdown; when switch 268 is off, the output is zero.

Resorting to this SEPIC topology with voltage regulation allows to perform at the same time the function of a dummy load for the dimmer.

In normal operating conditions (without dimming) the output voltage of the SEPIC topology is set to the value Vcc, and the duty cycle of the electronic switch (mosfet) 268 varies according to the value of the input voltage.

When the dimmer is activated, microcontroller 24 turns off the driver 22 and switches to the stand-by mode. The mosfet of the SEPIC topology is then maintained on (it is assumed that voltage Vcc does not decrease) by the control loop, so that between voltage Vbus and ground an equivalent network is obtained comprising input inductor 264 of SEPIC topology, connected in series to the SEPIC mosfet. In this way a dummy load is created, essentially by the SMPS converter, without the need of providing a separate and discrete stage adapted to operate as a dummy load.

When voltage Vbus returns to high, because the dimmer has been restored to conductive, the SEPIC stage starts to operate normally again, performing its function of regulating voltage Vcc.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A power supply device for light sources, the device comprising a feed line from mains via a phase-cut dimmer, selectively switchable between a conductive state and a non-conductive state, to permit or interrupt feeding of the device from mains, the device comprising:
   a power stage to feed at least one light source from said feed line from mains;
   a drive stage for said power stage; and
   a supply stage for said drive stage, said supply stage connected to said feed line from mains;
   wherein the device further comprises a sensor to detect when said dimmer is non-conductive and when said dimmer is conductive; and
   wherein the drive stage is coupled to the sensor to disable driving of said power stage when the sensor indicates that the dimmer is non-conductive, and enable driving of the power stage when the sensor indicates that the dimmer is conductive.

2. The device of claim 1,
   wherein the drive stage comprises at least one control module switchable between a low-power absorption standby condition when the sensor indicates that the dimmer is non-conductive and an operative drive condition of the power stage when the sensor indicates that said dimmer is conductive.

3. The device of claim 1,
   wherein the sensor comprises a zero level detector sensitive to the waveform from the dimmer to provide said drive stage a signal indicative that the dimmer is non-conductive.

4. The device of claim 1,
   wherein the sensor comprises a voltage divider sensitive to the waveform from the dimmer to provide to the drive stage a signal indicative that the dimmer is conductive.

5. The device of claim 4, further comprising:
   a rectifier acting on the waveform from the dimmer; and
   wherein the voltage divider is sensitive to the waveform rectified by the rectifier.

6. The device of claim 4,
   wherein the voltage divider comprises a zener diode to clamp the output voltage from the divider.

7. The device of claim 4,
   wherein the voltage divider is coupled to an electronic output switch driven by the voltage divider to provide to the drive stage a signal indicative that the dimmer is conductive.

8. The device of claim 1, further comprising:
   a dummy load to be selectively coupled and de-coupled with respect to the output of the dimmer when the sensor indicates that the dimmer is non-conductive and when the sensor indicates that the dimmer is conductive, respectively.

9. The device of claim 8,
   wherein the dummy load is selectively coupled and de-coupled with respect to the output of the dimmer via the drive stage.

10. The device of claim 1,
    wherein the supply stage for the drive stage is a buck converter.

11. The device of claim 8,
    wherein the supply stage for the drive stage is a SEPIC converter with a respective electronic switch interposed between the two inductors of the SEPIC converter, the respective electronic switch adapted to be made conductive by connecting to ground a first inductor in the SEPIC converter when the sensor indicates that the dimmer is non-conductive, thereby realizing the dummy load.

12. A method of operating a power supply device for light sources, the power supply device comprising:
- a power stage to feed at least one light source;
- a drive stage for enabling and disabling said power stage; and
- a supply stage for said drive stage;

the method comprising:
- a phase-cut dimming operation effected by permitting or interrupting feeding of the device from mains, the phase-cut dimming operation comprising:
- detecting when the feeding is interrupted or permitted;
- disabling driving of the power stage when interruption of the feeding is detected and enabling driving of the power stage when the feeding is detected to be permitted
- switching the drive stage to a tow-power absorption standby condition when interruption of the feeding is detected and switching out of said standby condition when the feeding is detected to be permitted.

* * * * *